(12) United States Patent
Kiljunen et al.

(10) Patent No.: US 10,350,783 B2
(45) Date of Patent: Jul. 16, 2019

(54) SELF-ADHESIVE MATERIAL FOR WOOD BOARD AND WOOD BOARD

(71) Applicant: UPM-Kymmene Wood Oy, Lahti (FI)

(72) Inventors: Samantha Kiljunen, Lappeenranta (FI); Marjaliisa Asikainen, Lahti (FI); Gatja Tiusanen, Nastola (FI)

(73) Assignee: UPM PLYWOOD OY, Lahti (FI)

( * ) Notice: Subject to any disclaimer, the term of this patent is extended or adjusted under 35 U.S.C. 154(b) by 404 days.

(21) Appl. No.: 14/959,103

(22) Filed: Dec. 4, 2015

(65) Prior Publication Data

US 2016/0082700 A1 Mar. 24, 2016

Related U.S. Application Data

(62) Division of application No. 12/918,297, filed as application No. PCT/FI2009/050130 on Feb. 18, 2009, now abandoned.

(30) Foreign Application Priority Data

Feb. 18, 2008 (FI) .................................. 20085147
Feb. 18, 2008 (FI) .................................. 20085152
May 16, 2008 (FI) .................................. 20085465

(51) Int. Cl.
*B27D 1/04* (2006.01)
*B27D 1/08* (2006.01)
(Continued)

(52) U.S. Cl.
CPC ................ *B27D 1/04* (2013.01); *B27D 1/08* (2013.01); *B32B 7/10* (2013.01); *B32B 7/12* (2013.01);
(Continued)

(58) Field of Classification Search
CPC .. B27D 1/04; B27D 1/08; B32B 21/04; B32B 21/08; B32B 27/32; B32B 27/20;
(Continued)

(56) References Cited

U.S. PATENT DOCUMENTS 3,480,506 A 11/1969 Hart et al.
4,087,587 A * 5/1978 Shida .................. B32B 27/32
428/500

(Continued)

FOREIGN PATENT DOCUMENTS

CA 931 486 A1 8/1973
CA 2 274 386 12/1999
(Continued)

OTHER PUBLICATIONS

European Search Report for Application No. EP 09 71 3411 dated Mar. 15, 2012.
(Continued)

*Primary Examiner* — Scott R. Walshon
(74) *Attorney, Agent, or Firm* — Cantor Colburn LLP

(57) ABSTRACT

A self-adhesive material for a wood board is described. The self-adhesive material is formed of polyolefin film having a melt index is ≤4 g/10 min (measured at 190° C. and 2.16 kg), and the polyolefin film contains reactive groups with —OH groups of the wood for forming self-adhesive properties. Further, a wood board in which the self-adhesive material is used as a coating and/or as a glue-line material is described.

14 Claims, 2 Drawing Sheets

Figure 1:
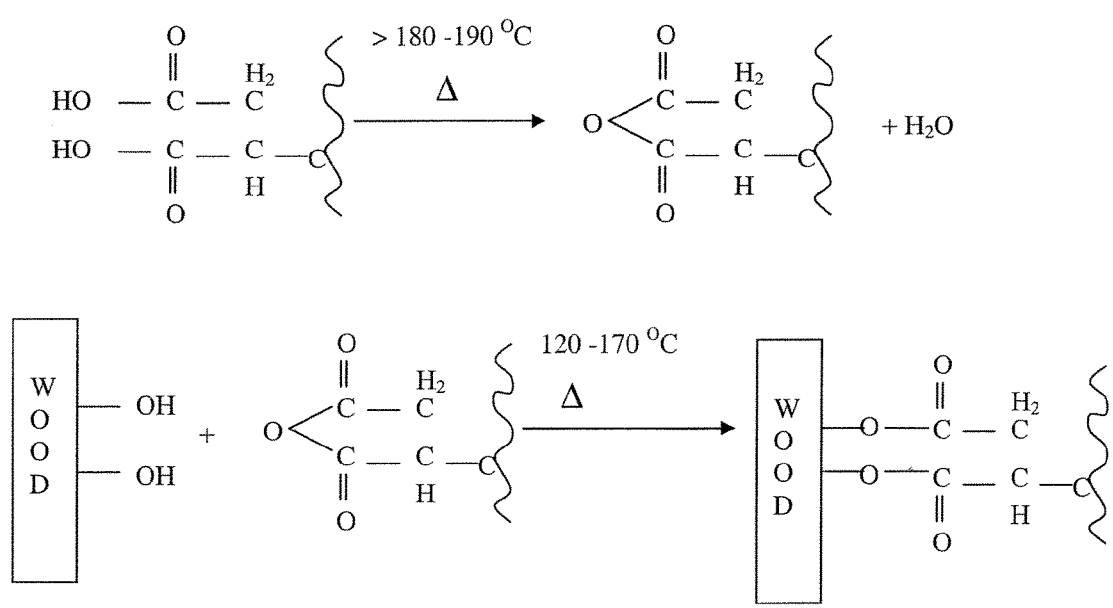

(51) Int. Cl.
- *B32B 7/12* (2006.01)
- *B32B 21/08* (2006.01)
- *B32B 27/32* (2006.01)
- *C08J 5/18* (2006.01)
- *B32B 7/10* (2006.01)
- *B32B 21/02* (2006.01)
- *B32B 21/14* (2006.01)
- *B32B 27/08* (2006.01)
- *B32B 27/20* (2006.01)
- *B32B 37/12* (2006.01)
- *B32B 37/18* (2006.01)

(52) U.S. Cl.
CPC .............. *B32B 21/02* (2013.01); *B32B 21/08* (2013.01); *B32B 21/14* (2013.01); *B32B 27/08* (2013.01); *B32B 27/20* (2013.01); *B32B 27/32* (2013.01); *B32B 37/1292* (2013.01); *B32B 37/18* (2013.01); *C08J 5/18* (2013.01); *B32B 2307/542* (2013.01); *B32B 2307/554* (2013.01); *B32B 2317/16* (2013.01); *B32B 2479/00* (2013.01); *B32B 2605/00* (2013.01); *C08J 2351/06* (2013.01); *Y10T 428/2848* (2015.01); *Y10T 428/2891* (2015.01); *Y10T 428/31895* (2015.04)

(58) Field of Classification Search
CPC .. B32B 37/1292; C08J 5/18; Y10T 428/2848; Y10T 428/2891; Y10T 428/31895
See application file for complete search history.

(56) References Cited

U.S. PATENT DOCUMENTS

| | | | |
|---|---|---|---|
| 4,506,056 | A | 3/1985 | Gaylord |
| 4,684,576 | A | 8/1987 | Tabor |
| 4,788,264 | A * | 11/1988 | Ukita ................... C08F 255/02 525/263 |
| 4,957,968 | A | 9/1990 | Adur et al. |
| 5,654,091 | A | 8/1997 | Kiriazis et al. |
| 5,994,474 | A | 11/1999 | Wey et al. |
| 7,125,929 | B2 | 10/2006 | Ward |
| 7,589,145 | B2 | 9/2009 | Brant et al. |
| 7,750,078 | B2 | 7/2010 | Curry |
| 2002/0156144 | A1 | 10/2002 | Williams et al. |
| 2006/0020067 | A1 | 1/2006 | Brant et al. |
| 2007/0129498 | A1 | 6/2007 | Curry |
| 2008/0138558 | A1 | 6/2008 | Hojabr et al. |

FOREIGN PATENT DOCUMENTS

| | | |
|---|---|---|
| EP | 0 171 777 A2 | 2/1986 |
| EP | 0 782 917 A1 | 7/1997 |
| GB | 1 037 404 A | 7/1966 |
| GB | 2 092 063 A | 8/1982 |
| JP | 6-136148 A | 5/1994 |
| JP | 9-235319 A | 9/1997 |
| WO | WO 99/06210 A1 | 2/1999 |
| WO | WO 00/24577 | 5/2000 |

OTHER PUBLICATIONS

Russian Office Action for corresponding Russian Patent Application No. 2010134493/04 dated Aug. 30, 2012.

* cited by examiner

SELF-ADHESIVE MATERIAL FOR WOOD BOARD AND WOOD BOARD

This application is a Divisional of U.S. application Ser. No. 12/918,297, filed Dec. 1, 2010, which is a National Stage Application of PCT/FI2009/050130, filed Feb. 18, 2009, which claims benefit of Serial No. 20085147, filed Feb. 18, 2008 in Finland, Serial No. 20085152, filed Feb. 18, 2008 in Finland and Serial No. 20085465, filed May 16, 2008 in Finland, and which applications are incorporated herein by reference. To the extent appropriate, a claim of priority is made to each of the above disclosed applications.

FIELD OF THE INVENTION

The invention relates to a self-adhesive material for a wood board as defined in the preamble of claim 1 and to a wood board as defined in the preamble of claim 16.

BACKGROUND OF THE INVENTION

Known from prior art are various wood boards. Wood boards meant here are, for example, plywood, particle boards and hard and medium hard fiber boards. These products need often a coating over them to protect the base product or to give some specific surface property to them.

Coatings used for wood products are normally some organic polymers, very often resins like phenolic resins and melamine resins. Thermoplastic coatings are also used, but the problem with them is how to adhere them to wood panels or products. Polymer priming is one method with the use of hot-melt glues.

For preparing the wood board resins and various gluing material are used to glue and join together veneers of the wood board. Known from prior art is to glue veneer layers together, e.g. with a polyurethane or phenolic glue.

Also known is to use maleated polyethylene (MAPE) or maleated polypropylene (MAPP) for making wood fiber-polymer composites, where the maleated polymer is used as a coupling agent between the fiber and polymer. Known is that cellulose fibers can be surface modified with polypropylene-maleic anhydride copolymer.

Further, known from patent application EP 0782917 is the preparation of a coated board with extruded films. The film comprises in one embodiment maleic anhydride grafted ethyl-vinyl acetate co-polymer (MA-g-EVA). No treatment, e.g. no activation, of the film during film manufacture is employed.

OBJECTIVE OF THE INVENTION

The objective of the invention is to disclose a new type of self-adhesive material and the attachment of the material to a wood board. The invention aims to solve coating and gluing the veneers of the wood board with a complete new and very simple way.

SUMMARY OF THE INVENTION

A self-adhesive material for a wood board and a wood board according to the invention are characterized by what is presented in the claims.

The invention is based on a self-adhesive material for a wood board, e.g. for gluing and/or coating. In accordance with the invention, the self-adhesive material is formed of polyolefin film having a melt index is ≤4 g/10 min (measured at 190° C. and 2.16 kg), the polyolefin film contains reactive groups with —OH groups of the wood for forming self-adhesive properties. Polyolefin film is a self-adhesive by means of the reactive groups.

Further, the invention is based on a wood board, which wood board is formed so that the veneers of the wood board are joined together. In accordance with the invention, the wood board is manufactured by said self-adhesive material so that the self-adhesive material is used as a coating onto board and/or as a glue-line material between veneers.

The invention is specifically based on the self adhesive film. The self-adhesive film is grafted by reactive groups, e.g. maleic anhydride groups, which react and form covalent bonds with —OH groups in other material e.g. natural products like wood or wood derivative products. The melt index being ≤4 g/10 min (measured at 190° C. and 2.16 kg) makes the activation of the reactive groups possible in film form.

In this context, a wood board refers to any wood panel product, plywood product, particle board, fiberboard, composite product, beam, pressed panel product or the like, formed of a number of veneers and principally of wood-based materials, in which the veneers are laid one upon the other and glued together. Further, a wood board refers to any wood product or fiber product. In this context, a veneer refers to any layer of material, typically a thin layer of material. In a preferable embodiment the wood board is plywood.

A wood board according to the invention can comprise veneer layers of different thickness. The thicknesses of the veneer layers can vary. The veneer layers can be arranged in the desired position, i.e. crosswise or lengthwise in the desired order.

In one embodiment of the invention the polyolefin film is at least partially cross-linked.

In one embodiment of the invention the polyolefin film comprises at least two layers which are the first and second layer, and at least the first layer is a self-adhesive layer so that it contains reactive groups with —OH groups of the wood. In one embodiment of the second layer is at least partially cross-linked. In on embodiment the first layer is at least partially cross-linked. In one embodiment the second layer contains also reactive groups with —OH groups of the wood. In one embodiment at least one additive layer is arranged between the first and second layers. In one embodiment the film can comprise more than one additive layers e.g. 2-10 additive layers. In one embodiment the additive layer can contain functional additive. In one embodiment the additive layer can contain, for example, fire retardants, UV-stabilizers and fillers.

In one embodiment of the invention polyolefin is selected from group: polyethylene, polypropylene and their combinations. The polyolefin film or each layer can include additives and fillers.

The polyolefin film and/or the film layers can be made from petrochemical and renewable feedstock materials. In addition to bio-based polymers can be used. Preferably, the bio-based polymers have processing temperature over 180° C. or over 190° C. In one embodiment, all film layers are substantially formed of the same material. In an alternative embodiment, at least one film layer is formed of a different material than the other films layers.

Compatibilisers can be added to the film in order to adhere the dissimilar polymers to each other.

In one embodiment of the invention the reactive groups of the polyolefin film is activated at temperatures of more than 180° C., in one embodiment at temperatures of more than 190° C., during the manufacturing of the self-adhesive material. In one embodiment, the sufficient time for activation is about 0.5-3 minutes, in one embodiment about 2-3 minutes. Then the film formed contains activated functional groups capable of forming the maximum number of covalent bonds with wood.

In one embodiment of the invention the polyolefin film contains maleated polyolefin which contains maleic anhydride reactive groups.

In one embodiment of the invention the film layer contains polyethylene (PE), polypropylene (PP), maleic anhydride polyethylene (MAPE), maleic anhydride polypropylene (MAPP) or derivates thereof or their combinations. In a preferred embodiment at least one film layer contains maleic anhydride polyolefin. In one embodiment the outer film layers contain maleic anhydride polyolefin.

In one embodiment a laminated layer can be added onto the self-adhesive material. The laminating improves mechanical properties and scratch resistant of the self-adhesive material.

The polyolefin films can be adhered directly to the wood when the film is maleated at least on one side and especially when the maleated layer is treated so that its temperature during manufacturing has been over 180° C. or 190° C., so that maleic acid is converted to maleic anhydride. Maleic anhydride is very reactive with wood, forming a covalent bond with celluloses —OH groups. Without this activation, normal maleated film forms predominantly hydrogen bonds, which are much weaker than covalent chemical bonds. So we also can bond polyolefin film directly to wood without any priming and joining layers.

In a preferred embodiment of the invention the self-adhesive material and the wood board are joined together by means of the maleic anhydride polyolefin. The maleic anhydride polyolefin forms chemical and mechanical bonds between the polyolefin film and the veneer of the wood board.

In a preferred embodiment the film or the film layer which includes maleated polyolefin also contains polymer e.g. polyethylene or polypropylene. Preferably, the film layer including maleated polyolefin essentially consists of MAPE+PE or MAPP+PP.

In one embodiment of the invention maleated polyolefin contains maleic acid 0.3-15% by weight of the maleated polyolefin, in one embodiment 1-5% by weight of the maleated polyolefin. Preferably, the film layer is maleated to the desired degree in order to improve friction and wetting properties of the self-adhesive material.

In one embodiment of the invention the polyolefin film contains iso-cyanate grafted polyolefin which contains reactive groups.

In one embodiment of the invention the polyolefin film or layer of the film is grafted with alkoxysilane containing reactive functional groups with the polyolefin. In one embodiment the polyolefin film is grafted with hydrolysable vinyl-mono-, -di- or -tri-alkoxysilane. In one embodiment vinyl group can be replaced with isocyanate- or epoxy groups. Alkoxysilanes alcohol groups can be methyl-, ethyl-, propyl- or isopropyl-groups and silane can contain 1, 2 or 3 alkoxy-groups. The reaction with polyolefin with the vinyl or other reactive groups happens already during the polyolefin film extrusion and reaction with wood by silane-groups during or after the manufacturing of the wood board.

In one embodiment of the invention the polyolefin film is cross-linked by a method selected from group: silane moisture method, electron beam (EB) radiation, vinyl-silane hydrolysis and their combinations. The cross-linking can be made before the film is pressed to wooden surface or on veneer of the wood board. Alternatively the cross-linking can be made after the manufacturing the wood board into final product.

The thickness of the polyolefin film may vary depending on the properties of the film materials and the application of the wood board.

The wood board can be made using apparatuses and methods known per se. Laying the veneers one upon the other, joining them together and other typical steps in making the wood board can be performed in any manner known per se in the art.

The self-adhesive material can be prepared using apparatuses and methods known per se, e.g. by extrusion or by co-extrusion. Arranging the self-adhesive material of the invention on the surface or between the veneers of the wood board can be performed e.g. using the hot-pressing technique, extruder technique, film technique, roll application technique, cylinder application technique, coat and multilayer coat application technique, all known per se, their combinations or a corresponding technique. The veneers can be joined together e.g. using the hot-pressing technique.

In one embodiment a catalyst is used in self-adhesive material manufacturing. The catalyst increases the frequency of the covalent bonds formed between coupling agent, e.g. maleic anhydride, and wood. Catalyst known to create such bonds and preferred is zinc anhydride. Preferably, the catalyst is hydrated zinc acetate. The catalyst cannot be extruded in the same layer as the coupling agent, e.g. maleic anhydride because it will open the maleic anhydride cyclic ring. Therefore, the catalyst can be applied to the films after extrusion and activated by heat during hot-pressing or applied directly to the wood. Alternatives are to extrude films of varying thickness (0.05-0.1 mm) such that one film contains catalyst in the outer layers and another the activated coupling agent such that the films are then during hot-pressing melt blended and reaction with the wood.

In one embodiment the polyolefin film can be prepared by using catalysts known per se.

In one embodiment of the invention the self-adhesive material is attached onto the veneers of the wood board by hot-pressing at temperatures of 120-170° C. The self-adhesive material is attached to the veneer by reactive groups. A benefit of one embodiment of this invention is that temperatures of only 120-140° C. are needed to fix the film onto the veneer surface. The hot-pressing conditions, like temperature, pressure and time, depend on the wood type, e.g. spruce or birch, and polyolefin melting temperature. It is important in order to induce plastic melt flow that the hot-pressing temperature is set to a temperature 20-50° C. above the melting temperature of the polymer.

According one embodiment of the invention the surface properties can be modified using fillers in the surface layer and using different degrees of maleation. High density maleation on the surface modifies its properties in the direction of polar material wetting, which also means a higher friction coefficient. This is a positive improvement especially in transport industry. This maleated surface is also excellent surface for painting especially with water based paints. Polar groups will also wet the surface at sterilization with $H_2O_2$ or HClO or other desinfective materials, used in slaughterings, meat and fish transport vehicles etc.

The invention makes it possible to prepare self-adhesive films. Adhesion of the self-adhesive material on wood is excellent.

The self-adhesive material and the wood board in accordance with the invention are suitable for various applications. The wood board can be used for applications where high wear resistance is needed, e.g. side walls of vans, trailers, horse boxes, kitchens and furniture, play ground equipment, sports equipment, flight cases and sign boards.

LIST OF FIGURES

Figure 2:
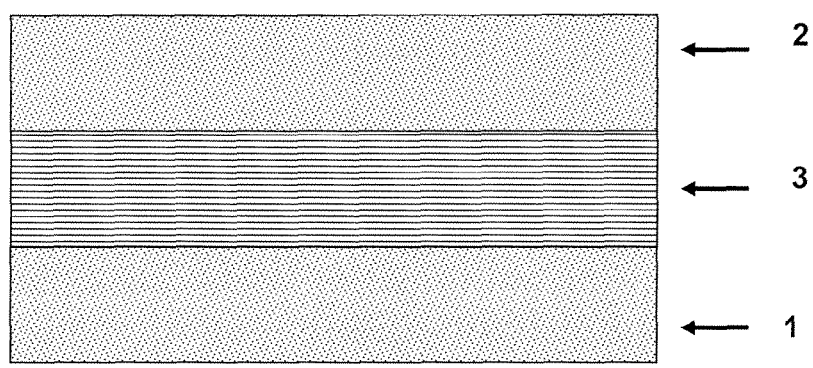

In the following, the invention is described by means of detailed embodiment examples with reference to accompanying FIGS. 1 and 2, in which FIG. 1 shows a schematic diagram of the chemical reactions, and FIG. 2 shows a self-adhesive material structure according to the invention.

DETAILED DESCRIPTION OF THE INVENTION

FIG. 1 discloses a schematic diagram of the chemical reactions in the manufacturing the self-adhesive material and the wood board, e.g. plywood. To make the plywood of the invention there are many steps. First is selection of the raw materials. Then is the conversion of the maleated material from maleic acid to maleic anhydride. The self-adhesive film is made it needs to be attached to the plywood where the active maleic anhydride groups react with the hydroxide groups of the wood.

FIG. 2 discloses a self-adhesive material structure of the invention.

The self-adhesive material is formed of a film which comprises three layers: first (1), second (2) and additive (3) layers. The first layer is a bottom layer (1), second layer is a top layer (2) and additive layer (3) is arranged between the first and second layers.

The top film layer (2) is formed of polyolefin, e.g. polyethylene or polypropylene, and maleated polyolefin, e.g. maleic anhydride polyethylene (MAPE) or maleic anhydride polypropylene (MAPP), including additives and fillers. The top film layer can be cross-linked.

The bottom layer (1) is formed of MAPE or MAPP.

The additive layer (3) is sandwiched between the top layer (2) and the bottom layer (1). The additive layer is formed of polyethylene or polypropylene including additives, like fire retardants and UV-stabilisers, and fillers.

The self-adhesive material and the wood board used in the tests can be prepared following. At the first stage, the three-layer self-adhesive film is prepared of polyolefin, maleated polyolefin and additives and fillers by co-extruding. Maleated polyolefin contains maleic acid which is converted to maleic anhydride at temperatures of more than 190° C. during the manufacturing of the film. The top film layer can be cross-linked by electron beam radiation at this stage. The layers of the film are joined together for forming the film. At second stage, the formed film is cut to size and is arranged between the veneers of the wood board and/or onto the wood board as a coating. The veneers of the wood board are bound together and/or the coating is attached on the surface by hot pressing, cold pressing and/or high frequency pressing. The hot pressing is made at temperatures of about 120-140° C., at pressure of about 1.2-1.9 N/mm$^2$ and by time of 2-8 minutes. The cold pressing can follow the hot pressing. The cold pressing is made until the temperature falls below 80-100° C., at pressure of about 1.2-1.7 N/mm and by time of 0.5-5 minutes. The high frequency pressing is made by frequency of 13.10 MHz and time of about 2-5 minutes. In an alternative embodiment, the self-adhesive material can be cross-linked by radiation or silane-moisture method at this stage.

A wood board can be plywood, particle board, high or middle density fiberboard, or some other pressed and glued board containing wood or other plant fibers.

When dissimilar polymers are co-extruded a compatibiliser material is required in the self-adhesive material to join the dissimilar materials.

The maleated polyolefin contains normally 2-15% maleic acid of the amount of polyolefin. At extrusion at temperatures of more 180° C. the maleic acid is converted to maleic anhydride, partially or totally. The polymer film can also be cross-linkable if it in any case improves the use of the products.

Example 1

In this example, a preparation of the polyethylene film was tested. The polyethylene film containing maleic acid was heated and activated so that maleic acid was converted to maleic anhydride during the preparation of the film. In table 1 is disclosed results of the test.

TABLE 1

| Treatment temperature (° C.) | Treatment time (minutes) | Maleic acid (%) | Maleic anhydride (%) |
| --- | --- | --- | --- |
| No treatment | N/A | 55 | 45 |
| 170 | 3 | 36 | 64 |
| 180 | 3 | 20 | 80 |
| 185 | 3 | 14 | 86 |
| 190 | 3 | 10 | 90 |
| 195 | 3 | 8 | 92 |

It is clear from the results of Table 1 that the maleic acid is converted mostly to maleic anhydride at temperatures of more than 180° C. for 3 minutes and therefore it can be considered that during extrusion where the polymer is in the melt for about 2-3 minutes that an extrusion temperature of >180° C. is sufficient but preferably >190° C.

Example 2

In this example, the self-adhesive material of FIG. 2 used in the tests was prepared. The tests are carried out as follows.

Adhesion of the coating to the plywood was measured by three different methods peel test (ISO4578, SFS-EN204), the result was the separation force as a function of coating length (25 mm). The second test was the dolly test (EN311) and the third test was the shearing test. In the case of the shearing test and peeling test the measurements could be made after soaking and boiling in addition to the dry samples. However, the dolly test could only be performed on dry samples.

Table 2 discloses birch plywood coating adhesive properties peeling (ISO 4578, SFS-EN204) and pull strength (dolly test, EN311). The melt index of the polyethylene is MI—0.3 g/10 min (190° C./2.16 kg). The coupling agents are Fusabond MD-353D (MAPP) and Fusabond MB-226DE (MAPE). Pressing conditions are: Temp. 130-150° C., Pressure 1.8 N/mm$^2$ and Time 8 minutes.

TABLE 2

| | Film thickness (mm) | Coupling agent | Peel strength N/mm | Pull strength N/mm$^2$ Strength N/mm$^2$ | Wood fibre (%) |
|---|---|---|---|---|---|
| 2% MAPE + PE/PE/PE + 2% MAPE | 0.27 | Fusabond MB-226DE | 1.4 | 1.7 | 90 |
| 2% MAPE + PE/PE/PE | 0.1 | Fusabond MB-226DE | 0.8 | 2.2 | 95 |
| 2% MAPP + PP/PP/PP | 0.1 | Fusabond MD-353D | 1 | 1.6 | 85 |
| Multi-Wall | 0.28 | — | | 2.1 | 2.2 | 100 |

It is clear from Table 2 that the adhesive bond to plywood is to a similar level as WISA Multiwall which is glued with polyurethane glues. The bonding of this coating is WBP exterior bonded to EN314-2/Class 3.

Table 3 discloses birch plywood coating adhesive properties peel strength measured for dry samples and after soaking and boiling. In all cases the melt index (MI) of the polyethylene is 0.3 (190° C./2.16 kg) except where specified as HDPE or MDPE and then MI—0.2 g/10 min (190° C./2.16 kg) or MI—0.7 g/10 min (190° C./2.16 kg) respectively is used. Hot pressing conditions are: Temp. 135-160° C., Pressure 1.7 N/mm$^2$ and Time 3.5-8 minutes. The coupling agent used was Fusabond MB-226DE unless otherwise specified.

TABLE 3

| Film type | Film thickness (mm) | Peel strength N/mm dry | soaked | boiled |
|---|---|---|---|---|
| 2% MAPE + PE/PE/PE + 2% MAPE | 0.27 | 1 | 0.7 | 0.5 |
| 2% MAPE + PE/HDPE/PE + 2% MAPE | 0.27 | 1.8 | 0.9 | 0.7 |
| 2% MAPE + PE/MDPE/PE + 2% MAPE | 0.27 | 0.9 | 0.6 | 0.2 |
| 2% MAPE + PE/PE/PE + 2% MAPE (Fusabond 603) | 0.27 | 0.6 | 0.5 | 0.4 |
| WISA Multi-Wall | 0.28 | 2.1 | 1.3 | 1.2 |

It is clear from the results in Table 3 that the peeling test is influenced by coating stiffness and is not totally a measure of adhesive strength to wood. It is also observed that the Fusabond 603 coupling agent is less affective. However, it is clear that the coating version with HDPE co-extruded in the middle layer is at a equivalent peeling strength as WISA Multiwall for dry and soaked conditions.

Table 4 discloses birch plywood coating adhesion properties peeling (ISO 4578, SFS-EN204) and shear strength perpendicular to the surface (EN319) after different pretreatments (dry, soaking, boiling, EN204) for uncross-linked and cross-linked coated (0.27 mm) plywood. Hot-pressing: 7 minutes, 135° C. and 1.7 N/mm$^2$. The coupling agent used was Fusabond MB-226DE unless otherwise stated.

TABLE 4

| Film | Peel strength (ISO 4578) N/mm dry | boiled | Shearing strength (EN319) N/mm$^2$ Dry Strength | Wood failure (%) | Shearing strength (EN319) N/mm$^2$ Boiled Strength | Wood failure (%) |
|---|---|---|---|---|---|---|
| 2% MAPE 2 + PE/PE/PE + % MAPE (uncrosslinked) | 1.1 | 0.6 | 1.4 | 100 | 0.8 | 100 |
| 2% MAPE + PE/PE/PE + % MAPE (cross-linked: 150 KGy) | 1 | 0.6 | 1.03 | 100 | 0.28 | 100 |
| 2% MAPE + PE/PE/PE + 2% MAPE (Fusabond 603) uncrosslinked | 0.6 | 0.4 | 1.2 | 100 | 0.7 | 80 |
| 2% MAPE + PE/PE/PE + 2% MAPE (Fusabond 603) (cross-linked: 150 KGy) | 0.6 | 0.4 | 1.13 | 100 | 0.33 | 100 |
| 2% MAPE + PE/HDPE/PE + % MAPE (uncrosslinked) | 1 | 0.6 | — | — | — | — |
| 2% MAPE + PE/HDPE/PE + % MAPE (cross-linked: 150 KGy) | 0.9 | 0.4 | 1.03 | 100 | 0.32 | 100 |
| PE Mono Uncross-linked | — | — | 0.8 | 39 | 0.04 | 9 |

The results in Table 4 show that cross-linking by E-beam radiation (100-200 KGy) after hot-pressing to the plywood does not damage the wood; however it does not improve the adhesive properties. In addition to this scratch resistance was not improved. In the case of the cross-linked coatings in Table 4 the coatings were cross-linked after adhesion to the plywood; however, the films were also cross-linked before adhesion to the plywood and in those cases it was found that the cross-linking made it difficult to hot-press the coating to the plywood this is because the radiation cross-linking rendered the whole coating more heat resistant.

The mono film contained no MAPE it was just LDPE (MI—0.3 g/10 min, 190° C./2.16 kg). The aim of using just polyethylene to coat the surface was to show the effect of having no coupling agent. The results were acceptable for dry conditions but after boiling the wood failure was 9%. Therefore failure was in the coating. This shows the importance of forming a chemical bond.

Table 5 discloses birch plywood coating adhesive properties peel (ISO 4578 and SFS-EN204) and shear strength perpendicular to the surface (EN319) after different pretreatments (soaking, boiling, EN204) for low viscosity films (MI—4 g/10 min (190° C./2.16 kg) in all layers). The films could not be extruded above 170° C.

TABLE 5

| Film | Thickness (mm) | Melt index (MI) g/10 min (190° C./2.16 kg) | Peel strength N/mm | Shear strength (EN319) N/mm² Strength N/mm² | Wood failure |
|---|---|---|---|---|---|
| 3% Mape + PE/3% MAPE + PE/PE + 2% MAPE | 0.1 | 4 | Not possible | 0.83 (soak) | 90 (soak) |
| 3% Mape + PE/3% MAPE + PE/PE + 2% MAPE | 0.1 | 4 | Not possible | 0.06 (boil) | 3 (boil) |

It was not possible to measure the peel strength because the film coating with MI—4 g/10 min (190° C./2.16 kg) polyethylene since it had penetrated into the wood so that the coating was too thin to measure. It is clear from the results in Table 5 that MI—4 g/10 min (190° C./2.16 kg) provides deeper penetration into the wood; however, owing to the coupling agent not being converted sufficiently enough into maleic anhydride during extrusion there is poor chemical adhesion to the wood (hydrogen bonding) and therefore the shear strength properties after boiling are very poor with almost no wood fibre breakage. These results show the importance of forming a durable chemical bond.

Table 6 discloses birch plywood coated with multi-layered dissimilar self-adhesive coating properties (scratch, boiling resistance and delamination of polypropylene or polyamide). Hot-pressing conditions are: Temp. 140, Pressure 1.7 N/mm² and Time 8 min.

TABLE 6

| Film | Film thickness (mm) | Hot-press release paper used | Scratch resistance N | Delamination of coating layers during hot pressing |
|---|---|---|---|---|
| 2% Mape + PE/PA Polyamide laminated | 0.1 | No | 8-10 | No |
| 2% MAPE + PE/PE + mLLDPE + EVA/PP (co-extruded) | 0.1 | Yes | 8-10 | No |

The scratch test is performed using an Erichsen test pen (Model 318). The test was developed by Robert Boch GmBH. Samples 100×100 mm are prepared and then the pen is applied which has forces (2-20 N). The surface is simply scratched using the pen the scratch force is increased from 2-20 N in steps of 2N. The first scratch that can be seen by the naked eye is the force that the coating can take and therefore the scratch resistance level.

It is clear from Table 6 there is no delamination of the polyamide or polypropylene layers during hot-pressing and there is enough scratch resistance. The main advantage of the polyamide outer layer is that there is no need for any release paper during hot-pressing. Also cost of the coating is not increased considerably as this layer can be 12 μm. Thicker polyamide layers may improve the scratch resistant properties slightly (thickness 12-20 μm).

Table 7 discloses birch plywood coating hardness (DIN 53505) and scratch resistance properties for different coatings compared with other coating materials for plywood. The different maleated polymers used are Fusabond MD-353D (MAPP), and Fusabond MB-226DE (MAPE).

TABLE 7

| | Shore hardness (DIN 53505) | Scratch resistance (N) | $CaOH_2$ Boiling test |
|---|---|---|---|
| 2% MAPE + PE/PE/PE + 2% MAPE (0.27 mm) | 62 | 8-10 | Pass |
| 2% MAPE + PE/PE/PE + 2% MAPE (0.03 mm) | 63 | 8-10 | Coating worn away |
| 2% MAPP + PP/PP/PP (0.1 mm) | 56 | 8-10 | Pass |
| Wisa multiwall (0.28 mm) | 58 | 5-8 | Pass |

It can be seen from Table 7 that the scratch resistance of the self-adhesive coatings is higher than for WISA Multiwall. This is important from the point of view of where the coated plywood is used. If it is used where it is easily or frequently touched or there are sharp objects then it is important that the coating on the plywood does not scratch easily. The $CaOH_2$ boiling test results are also very important especially if the coatings are to be used in formwork for concrete applications.

A self-adhesive material and a wood board according to the invention are suitable in its different embodiments for different types of applications.

The embodiments of the invention are not limited to the examples presented rather many variations are possible within the scope of the accompanying claims.

The invention claimed is:

1. A wood board, in which the wood board comprises wood-based veneers and the wood board is formed so that the veneers of the wood board are joined together, wherein
the wood based veneers are bound together by a self-adhesive material formed of polyolefin film consisting of maleated polyolefin, and
the maleated polyolefin contains maleic anhydride groups as reactive groups which react with —OH groups of the wood for forming covalent bonds between the polyolefin film and —OH groups of the wood-based veneers and the reactive groups of the polyolefin film have been activated at temperatures of more than 180° C. during the manufacturing of the polyolefin film, so that maleic acid has been converted to maleic anhydride and the polyolefin film contains maleic anhydride reactive groups, and
the self-adhesive material is arranged as a glue-line material between the veneers for gluing the veneers together, and
the polyolefin film is bonded directly to a wood surface without any priming and joining layers.

2. The wood board according to claim 1, wherein the polyolefin film comprises at least two layers which are a first layer and a second layer, and the first layer and the second layer contain the maleic anhydride groups which react with the —OH groups of the veneers.

3. The wood board according to claim 1, wherein the polyolefin film comprises at least three layers, and the outer layers contain the maleic anhydride groups which react with the —OH groups of the veneers.

4. The wood board according to claim 1, wherein the polyolefin film has a melt index of less than or equal to 4 g/10 min wherein the melt index is measured at 190° C. and 2.16 kg.

5. The wood board according to claim 1, wherein the polyolefin film is at least partially cross-linked.

6. The wood board according to claim 1, wherein the maleic anhydride groups of the polyolefin film are activated at a temperature of more than 180° C. for about 0.5-3 minutes during the manufacturing of the polyolefin film.

7. The wood board according to claim 1, wherein the maleic anhydride groups of the polyolefin film are activated at a temperature of more than 180° C. for at least 2 minutes by converting the maleic acid to maleic anhydride during the manufacturing of the polyolefin film.

8. The wood board according to claim 1, wherein the polyolefin film is formed by extrusion.

9. The wood board according to claim 8, wherein the maleic anhydride groups of the polyolefin film are activated during the extrusion by providing the polyolefin film in a melt for about 2-3 minutes during the extrusion.

10. The wood board according to claim 1, wherein the maleated polyolefin contains maleic acid in the amount of 0.3-15% by weight of the maleated polyolefin and maleic anhydride.

11. The wood board according to claim 1, wherein the self-adhesive material is heated and arranged between the veneers of the wood board by hot pressing at temperatures of 120-170° C. for joining the veneers together.

12. The wood board according to claim 1, wherein the wood board is selected from group consisting of plywood, particle board, fiber board, and paper board.

13. The wood board according to claim 1, wherein a catalyst is used in the manufacturing of the self-adhesive material.

14. A method for manufacturing a wood board, in which wood-based veneers are joined together to form the wood board, wherein
 the wood based veneers are bound together by a self-adhesive material formed of polyolefin film consisting of maleated polyolefin, and
 the maleated polyolefin contains maleic anhydride groups as reactive groups which react with —OH groups of the wood for forming covalent bonds between the polyolefin film and —OH groups of the wood-based veneers and the reactive groups of the polyolefin film have been activated at temperatures of more than 180° C. during the manufacturing of the polyolefin film, so that maleic acid has been converted to maleic anhydride and the polyolefin film contains maleic anhydride reactive groups, and
 the self-adhesive material is arranged as a glue-line material between the veneers for gluing the veneers together, and
 the polyolefin film is bonded directly to a wood surface without any priming and joining layers.

* * * * *